US009088487B2

(12) United States Patent
Bauchot et al.

(10) Patent No.: US 9,088,487 B2
(45) Date of Patent: Jul. 21, 2015

(54) SERVER CLUSTER MONITORING

(71) Applicant: International Business Machines Corporation, Armonk, NY (US)

(72) Inventors: Frederic J. Bauchot, Saint-Jeannet (FR); Jacques Milman, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/335,106

(22) Filed: Jul. 18, 2014

(65) Prior Publication Data

US 2014/0330965 A1 Nov. 6, 2014

Related U.S. Application Data

(62) Division of application No. 13/342,545, filed on Jan. 3, 2012, now Pat. No. 8,819,226.

(30) Foreign Application Priority Data

Oct. 26, 2011 (EP) .................................... 11306386

(51) Int. Cl.
*G06F 15/16* (2006.01)
*H04L 12/26* (2006.01)
*G06F 11/34* (2006.01)
*G06F 3/06* (2006.01)

(52) U.S. Cl.
CPC ............ *H04L 43/08* (2013.01); *G06F 11/3419* (2013.01); *G06F 11/3495* (2013.01); *G06F 3/067* (2013.01); *G06F 3/0653* (2013.01); *G06F 11/3409* (2013.01)

(58) Field of Classification Search
CPC ... H04L 43/08; G06F 11/3409; G06F 3/0653; G06F 3/067
USPC .................................. 709/200–203, 217–227
See application file for complete search history.

(56) References Cited

U.S. PATENT DOCUMENTS

| | | | | |
|---|---|---|---|---|
| 5,862,326 | A | * | 1/1999 | Bapat ............................ 709/203 |
| 6,052,694 | A | | 4/2000 | Bromberg |
| 6,816,898 | B1 | * | 11/2004 | Garg et al. .................... 709/224 |
| 7,685,092 | B2 | | 3/2010 | Reichert et al. |
| 7,702,962 | B2 | * | 4/2010 | Numanoi ........................ 714/43 |
| 7,739,667 | B2 | | 6/2010 | Callahan, II et al. |
| 7,756,840 | B2 | | 7/2010 | Warshawsky |
| 7,885,969 | B2 | | 2/2011 | Natarajan et al. |

(Continued)

OTHER PUBLICATIONS

Sampemane et al., "Performance Monitoring on aan HPVM Cluster," Proceedings of the International Conference on Parallel and Distributed Processing Techniques and Applications, 2000, 7 pages.

(Continued)

*Primary Examiner* — Moustafa M Meky
(74) *Attorney, Agent, or Firm* — Andrea Barbuto; Hoffman Warnick LLC

(57) ABSTRACT

A master monitor spawns a local monitor in each node of a server cluster. Each local monitor, responsive to a database event, determines a metric of a performance-related variable. A maximum period between measurements may be imposed to reduce irrelevant results, as may a minimum period. The metric may be stored in a measurement file on the respective node and/or may be reported to the master monitor. The master monitor may make any reported metrics available to a user via a front end.

9 Claims, 3 Drawing Sheets

(56) References Cited

U.S. PATENT DOCUMENTS

| | | | |
|---|---|---|---|
| 7,958,393 B2* | 6/2011 | Bobak et al. | 714/15 |
| 8,117,387 B2* | 2/2012 | Matsuki et al. | 711/114 |
| 2005/0262386 A1* | 11/2005 | Numanoi | 714/5 |
| 2006/0026179 A1 | 2/2006 | Brown et al. | |
| 2007/0250538 A1 | 10/2007 | Moore | |
| 2008/0316938 A1 | 12/2008 | Shi | |
| 2010/0287019 A1 | 11/2010 | Guo et al. | |
| 2011/0022586 A1 | 1/2011 | Wilkinson et al. | |

OTHER PUBLICATIONS

Meky, Moustafa M., "Notice of Allowance and Fee(s) Due," Apr. 18, 2014, 5 pages.

Meky, Moustafa M., "Ex Parte Quayle Action," Aug. 27, 2013, 9 pages.

* cited by examiner

SERVER CLUSTER MONITORING

CROSS-REFERENCE TO RELATED APPLICATIONS

This application is a Divisional of co-pending U.S. patent application Ser. No. 13/342,545, filed Jan. 3, 2012, which claimed priority to European Application No. EP11306386.1, filed Oct. 26, 2011, which is hereby incorporated by reference herein.

BACKGROUND

The present invention relates to server supervision and, more specifically, to a system to supervise a server or server cluster hosting a massively parallel database engine.

A massively parallel (MPP) database engine may typically operate in a server cluster environment, such as a Unix server cluster, that may include multiple servers communicating via a network infrastructure. Database engines provide an infrastructure called UDF (User Defined Functions) which make possible substantially transparent and simultaneous or distributed execution of routines on all servers of a cluster. Using this infrastructure, it is possible to implement routines that collect system usage information on a cluster width scope. The collected information may subsequently be manipulated using a programming language, scripting language, query language, or the like. The Structured Query Language (SQL) is particularly suitable for data analysis such as cluster performance monitoring.

Computation of database usage metrics for a given period of time, however, may raise technical challenges. For example, on Unix systems, information is typically accumulated starting with startup of the system. As a result, in order to obtain a value for a given time period, deltas need to be computed by comparing metric values at the start and at the end of a monitoring period. When multiple metrics are to be evaluated on each node of a cluster, particularly by multiple concurrent users, this can lead to very high performance demand, particularly where a daemon runs on each node and where a consolidation is performed in a dedicated server. In addition, the homogeneity of successive monitoring periods should be taken into account to secure information consistency within reported database usage metrics. For example, a one millisecond measurement should not be compared with a three second measurement. Finally, such delta calculations should typically take place on each node of the cluster, with calculated values and/or cross calculated values to be consolidated into a single location and returned to a client application. This indicates that a comprehensive infrastructure where daemon synchronization and communication must be secured should be used.

In typical approaches to computation of such metrics, it is difficult to combine information collected on different computing servers to obtain cluster width performance analysis. In addition, most existing tools, such as Nagios or vendor products, are aimed at monitoring web or application servers, not database workloads.

SUMMARY

According to one embodiment of the present invention, a server cluster monitoring system may include a master monitor configured to run on a first node of a server cluster, the server cluster being configured to host a massively parallel database system including a database management system (DBMS) accessible via a front end. The master monitor may spawn a local monitor on each node of the server cluster and be configured to determine a value of a respective performance-related variable of the node for a respective predefined period. The local monitor may further be configured to store the determined value in a local measurement file on a respective storage device of the respective node.

In another embodiment, a massively parallel database server cluster monitoring method may be configured to monitor performance of a server cluster itself configured to host a massively parallel database. A master monitor may be started in a database server and may spawn a local monitor in each node of the server cluster. The local monitor may be configured to monitor for a database event and to be responsive to the master monitor. Responsive to a database event, each local monitor may obtain a current time and a current value of a first performance-related variable, and may determine whether a measurement file exists. Responsive to the measurement file not existing, the local monitor may create the measurement file; otherwise, the local monitor may read from the measurement file a last time and a last value of the first performance-related variable. The local monitor may then determine a first metric based on a difference between the current value of the first performance-related variable and the last value of the first performance-related variable. The current time may then be stored in the measurement file as the last time, and the current value of the first performance-related variable may be stored in the measurement file as the last value of the first performance-related variable. The local monitor may then resume monitoring for a database event.

Another embodiment of the invention described herein may include a computer program product for monitoring performance of a massively parallel database server cluster, the server cluster including a computing device configured to execute the computer program product. The computer program product may comprise instructions in the form of computer executable program code stored on a tangible computer readable storage medium. The computer executable program code may configure the computing device to start a master monitor, such as in a database server, that may spawn a local monitor in each node of the server cluster. Each local monitor may be configured to monitor for a database event and to be responsive to the master monitor. Responsive to a database event, each local monitor may obtain a current time and a current value of a first performance-related variable, and may determine whether a measurement file exists. Responsive to the measurement file not existing, the local monitor may create the measurement file; otherwise, the local monitor may read from the measurement file a last time and a last value of the first performance-related variable. The local monitor may then determine a first metric based on a difference between the current value of the first performance-related variable and the last value of the first performance-related variable. The current time may then be stored in the measurement file as the last time, and the current value of the first performance-related variable may be stored in the measurement file as the last value of the first performance-related variable. The local monitor may then resume monitoring for a database event.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
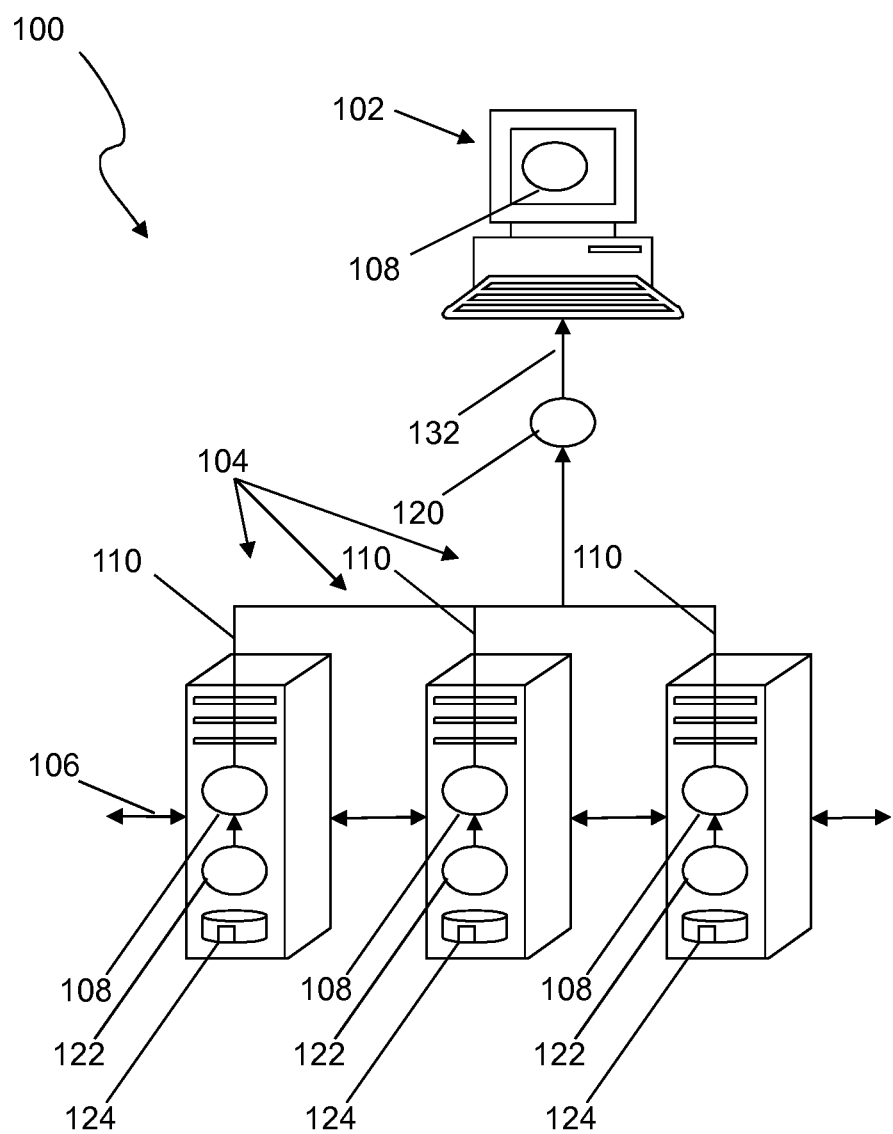
FIG. 1 is a schematic diagram of a server cluster monitoring system according to an embodiment of the invention disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Embodiments of the invention disclosed herein may be implemented, for example as a system, to monitor a server cluster 100 including a front end 102 and at least two node servers 104 connected via a first communications arrangement 106, such as a network, and administered via a database management system (DBMS) 108 that may be distributed over the cluster 100. DBMS 108 and other applications may communicate with front end 102 via a second communications arrangement 110, such as a network. In embodiments, a single communications arrangement may be used if desired, suitable, and/or advantageous.

According to embodiments of the invention disclosed herein, a master monitor 120 may be implemented as computer code executed on a computing device, such as on a node server 104, front end 102, or another computing device connected to first and/or second communications arrangement 106, 110. Master monitor 120 may be configured to spawn a local monitor 122 on each node server 104 of server cluster 100. In embodiments, each local monitor 122 may be configured to determine a value of a respective performance-related variable of respective node 104 for a respective predefined period. In addition, local monitor 122 may be configured to write the determined value to a local file 124, such as a measurement file, on a respective storage device 112 of respective node 104. While embodiments may monitor the same performance-related variable on all nodes 104, other embodiments of the invention may monitor one or more other performance-related variables, either instead of or in addition to the first performance-related variable, and each local monitor may monitor different groupings of performance-related variables as desired, suitable, and/or appropriate. Similarly, the predefined period may differ from node to node in embodiments as desired, suitable, and/or desired, and there may be different predefined periods for different performance-related variables. In embodiments, the predefined period may be determined by the system, may be read from a storage device, and/or may be entered by a user, such as via front end 102, as may be a maximum period and/or a minimum period. As with the predefined period, each node may have a different maximum period and/or a different minimum period, and there may be different maximum periods and/or minimum periods for different performance-related variables. In embodiments, obtaining the predefined period may include obtaining the minimum period and/or the maximum period, and the predefined period may include a minimum and/or maximum period, such as by being bound by such a minimum and/or maximum period. For a given performance variable, a normalized value may be computed on nodes 104 if periods are different.

Each local monitor may use the values obtained of time and performance-related variables to determine a metric of a respective node. For example, a current value of a performance variable may be compared to a previous or last value of the performance-related variable to obtain a delta or change in the performance-related variable. The delta may be reported directly and/or may be expressed as a rate by dividing the delta by elapsed time between values. For example, embodiments may obtain or determine elapsed time, such as by comparing a current time to a last or previous time. Last or previous values of performance-related variables and/or time may be stored, for example, in measurement file 124. In embodiments, each node has a respective measurement file. Provisions may be made to simply store current values in a measurement file at startup of a local monitor, depending, for example, on whether a respective maximum period has elapsed as will be explained below. Performance-related variable values and/or predefined periods may be obtained from DBMS 108, an operating system of the cluster, a node server operating system, or from other sources as appropriate and/or desired.

Figure 2:
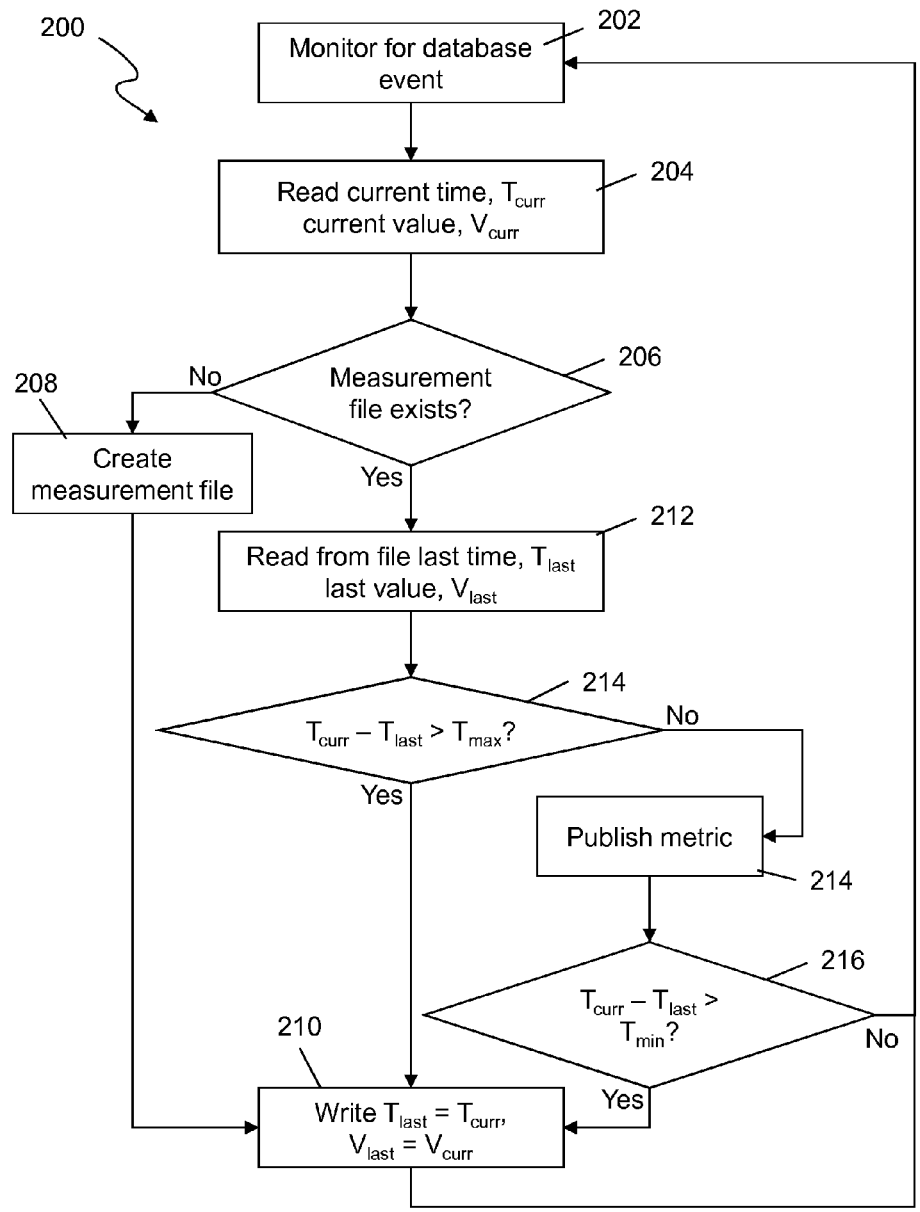
FIG. 2 is a schematic flow diagram of a server cluster monitoring method according to an embodiment of the invention disclosed herein.

With reference to FIG. 2, a server cluster monitoring method 200 may include monitoring for a database event (block 202), such as a SQL event. Responsive to a database event, a current time $T_{curr}$ and a current value of a first performance-related variable $V_{curr}$ are obtained or read (block 204), such as from DBMS 108 and/or a server clock. It is determined whether a measurement file exists (block 206) and a measurement file is created if none already exists (block 208), the current values of time and the first performance-related variable being stored as the last or previous values $T_{last}$ and $V_{last}$ (block 210) before returning to monitoring for a database event (block 202).

If at block 206 it is determined that a measurement file exists, last or previous values of time and the first performance-related variable $T_{last}$ and $V_{last}$ are read from the file (block 212). In embodiments including a maximum period $T_{max}$, a check is made to see if elapsed time exceeds the maximum period (block 214), such as by comparing a difference between $T_{last}$ and $T_{curr}$ to $T_{max}$. If elapsed time exceeds the maximum period, then the current values of time and the first performance-related variable are stored as the last or previous values $T_{last}$ and $V_{last}$ (block 210) before returning to monitoring for a database event (block 202). If elapsed time does not exceed the maximum period, then a metric based on the delta in the first performance-related variable may be reported (block 214). A check may then be made to see whether elapsed time exceeds a minimum period $T_{min}$ (block 216). If so, the current values of time and the first performance-related variable are stored as the last or previous values $T_{last}$ and $V_{last}$ (block 210) before returning to monitoring for a database event (block 202). If the minimum period has not been exceeded, then monitoring for a database event resumes (block 202) without storing the current values of time and the first performance-related variable.

Like the system described above, which may implement method 200, each node may monitor a different performance-related variable and/or more than one performance-related variable. In addition, each metric need not be determined relative to elapsed time, but may be determined relative to another variable, such as another performance-related variable or other suitable variable.

Figure 3:
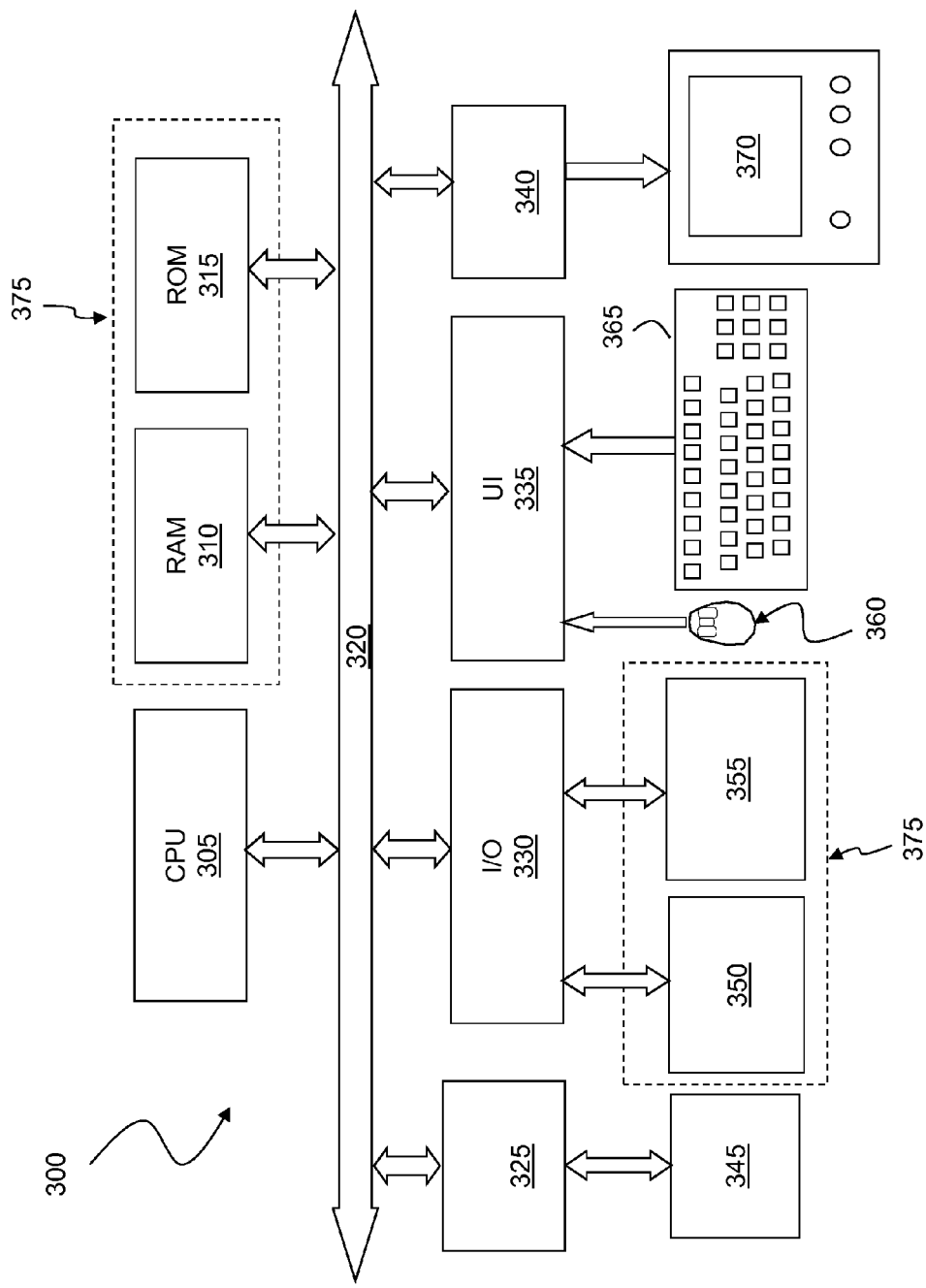
FIG. 3 is a schematic block diagram of a general purpose computer system which may be used to practice the invention.

FIG. 3 illustrates a block diagram of a general-purpose computer system which can be used to implement the system and method described herein. The system and/or method may be coded as a set of instructions on removable or hard media for use by such a general-purpose computer. FIG. 3 is a schematic block diagram of a general-purpose computer for practicing the present invention. FIG. 3 shows a computer system 300, which has at least one microprocessor or central processing unit (CPU) 305. CPU 305 is interconnected via a system bus 320 to machine readable media 375, which includes, for example, a random access memory (RAM) 310, a read-only memory (ROM) 315, a removable and/or program storage device 355 and a mass data and/or program storage device 350. An input/output (I/O) adapter 330 connects mass storage device 350 and removable storage device 355 to system bus 320. A user interface 335 connects a keyboard 365 and a mouse 360 to system bus 320, and a port adapter 325 connects a data port 345 to system bus 320 and a display adapter 340 connect a display device 370. ROM 315 contains the basic operating system for computer system 300. Examples of removable data and/or program storage device 355 include magnetic media such as floppy drives, tape drives, portable flash drives, zip drives, and optical media such as CD ROM or DVD drives. Examples of mass data and/or program storage device 350 include hard disk drives and non-volatile memory such as flash memory. In addition to keyboard 365 and mouse 360, other user input devices such as trackballs, writing tablets, pressure pads, microphones, light pens and position-sensing screen displays may be connected to user interface 335. Examples of display device 370 include cathode-ray tubes (CRT) and liquid crystal displays (LCD). In addition, front end 102 and/or each node server 104 may include variants of computing device 300.

As should be clear to one of ordinary skill in the art, computer executable instructions or computer program code for implementing embodiments of the inventive system and/or method may take the form of one or more languages. For example, computer program code may be written in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these and/or others now known and/or later developed and/or discovered. To this extent, server cluster monitoring system 100 and/or method 200 may be embodied as any combination of system software and/or application software.

A machine readable computer program or computer program product may be created by one of skill in the art and stored in computer system 300 or a data and/or any one or more of machine readable medium 375 to simplify the practicing of this invention. In operation, information for the computer program created to run the present invention is loaded on the appropriate removable data and/or program storage device 355, fed through data port 345 or entered using keyboard 365. A user controls the program by manipulating functions performed by the computer program and providing other data inputs via any of the above mentioned data input means. Display device 370 provides a means for the user to accurately control the computer program and perform the desired tasks described herein. A technical effect of the computer program product is to enable monitoring of massively parallel database server clusters with lower processor and communications overhead.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server cluster monitoring system comprising:
    a master monitor configured to run on a first node of a server cluster, the server cluster being configured to host a massively parallel database system including a database management system (DBMS) accessible via a front end; and
    a local monitor spawned on each node of a server cluster by the master monitor and configured to determine a value of a respective performance-related variable of the node for a respective predefined period, the local monitor further being configured to write the determined value to a local file on a respective storage device of the respective node.

2. The system of claim 1, wherein the respective predefined period is a time elapsed since a previous invocation of the respective local monitor.

3. The system of claim 1, wherein the respective predefined period is defined by a user.

4. The system of claim 1, wherein the respective predefined period includes at least one of a predefined minimum value or a predefined maximum value.

5. The system of claim 1, wherein the local monitor obtains a value of the performance-related variable from the DBMS.

6. The system of claim 1, wherein the local monitor obtains a value of the performance-related variable from an operating system of a node server.

7. The system of claim 1, wherein the local monitor further determines a respective node metric based on the respective performance-related variable.

8. The system of claim 3, wherein the local monitor determines a metric based on a change in value of the performance-related variable during the predefined period.

9. The system of claim 1, wherein the local monitor is further configured to report to the master monitor.

* * * * *